Dec. 23, 1969  A. I. KETO  3,485,503

OPERATING MECHANISMS

Filed Nov. 21, 1966  2 Sheets-Sheet 1

WITNESSES
Helen M. Farkas
James F. Young

INVENTOR
August I. Keto
BY Donald R. Lackey
ATTORNEY

Dec. 23, 1969   A. I. KETO   3,485,503

OPERATING MECHANISMS

Filed Nov. 21, 1966   2 Sheets-Sheet 2

United States Patent Office 3,485,503
Patented Dec. 23, 1969

3,485,503
OPERATING MECHANISMS
August I. Keto, Sharpsville, Pa., assignor to Westinghouse Electric Corporation, Pittsburgh, Pa., a corporation of Pennsylvania
Filed Nov. 21, 1966, Ser. No. 595,698
Int. Cl. F16j 15/54, 15/00
U.S. Cl. 277—26                                    8 Claims

ABSTRACT OF THE DISCLOSURE

An operating mechanism which includes a shaft member disposed through an opening in an insulating body member. Sealing means, including a resilient ring member and lubricating means, is disposed to provide a seal between the shaft member and body member, while allowing relative movement between the shaft member and body member.

---

This invention relates in general to new and improved operating mechanisms, and more particularly to new and improved operating mechanisms for imparting mechanical motion through a seal.

Certain types of mechanical devices are disposed within sealed enclosures, and they require mechanical actuation from a point external to the enclosure, or through a wall portion separating two sealed enclosures. The means for providing this function of imparting mechanical action through the wall of a sealed enclosure, without breaking the enclosure seal, may be broadly called operating mechanisms. For example, electrical distribution transformers may contain within the sealed transformer enclosure such mechanical devices as low voltage circuit breakers and high voltage switches, which have operating handles disposed external to the transformer enclosure. These devices, thus, require an operating mechanism to connect the internally mounted device with the external handles. Other mechanical devices, such as no-load tap changers and series-parallel switches may also be disposed within sealed transformer enclosures, and may also have external operating handles.

The operating mechanisms commonly used to transmit mechanical motion through a seal are assemblies of machined metallic parts, which are costly to manufacture and assemble. The assembly of a machined type operating mechanism is complicated by the care required in making oil-tight shaft seals; and, when external indicating means is required in the operating handle, such as a signal light, the assembly is further complicated due to the electrical insulating requirement. Also, if more than one device is to be actuated within one enclosure, each device will require a separate operating mechanism each disposed in a different sealed opening in the enclosure; or, extremely complicated combination type operating mechanisms will be required.

It would, therefore, be desirable to provide new and improved operating mechanisms for transmitting mechanical energy through a seal, which mechanisms have a relatively low cost, are easy to manufacture, and which will accommodate the addition of external indicating means without unduly complicating the assembly. It would further be desirable to be able to combine several mechanical functions into one operating mechanism assembly, to enable these mechanical functions to be performed through one sealed opening in the enclosure.

Accordingly, it is an object of the invention to provide new and improved operating mechanisms for imparting mechanical motion through a seal.

Another object of the invention is to provide new and improved operating mechanisms which do not require the assembly of a plurality of machined closely fitting parts.

A further object of the invention is to provide new and improved operating mechanisms which have a relatively low cost, and yet will provide an excellent air, oil and moisture seal.

Still another object of the invention is to provide new and improved operating mechanisms which will accommodate electrical indicating means without complicating or adding substantially to the cost of the operating mechanism assembly.

Another object of the invention is to provide new and improved operating mechanisms which facilitate the combining of a plurality of mechanical functions into an assembly which requires but one access opening in the casing of its associated apparatus.

Briefly, the present invention accomplishes the above-cited objects by providing an operating mechanism which has a body portion formed of a cast resinous material. The actuating shaft, or shafts, of the mechanism have a resilient sealing ring disposed thereon, and they, along with any required electrical or mechanical indicating means, are placed within a suitable mold. Mold release material is disposed on the surfaces of the actuating shaft or shafts to which it is not desired to have the resin adhere. The resin system is then added to the mold, set and cured, and the mechanism is complete. The operating mechanism may be disposed through an opening in the casing or enclosure which houses the mechanical device it is to operate, and sealed by suitable gasket means disposed between a flange on the body portion of the mechanism and the enclosure. It may be held in the desired position by a conventional spring grip type nut, bolts, or any other suitable mounting means. Thus, in a single casting step, the operating mechanism is completed, including the shaft seal or seals, and including electrical insulation for any electrical indicating devices incorporated therein. The mold release material used initially to prevent the resin from adhering to the operating shaft or shafts, now serves as lubrication. The resin adheres to the resilient sealing ring disposed about the shaft or shafts, but the ring does not adhere to the shaft, allowing shaft movement while simultaneously sealing the shaft. Axial motion may be prevented, if desired, by disposing the resilient sealing ring in an annular groove disposed in the shaft.

Further objects and advantages of the invention will become apparent from the following detailed description, taken in connection with the accompanying drawings, in which.

Figure 1:
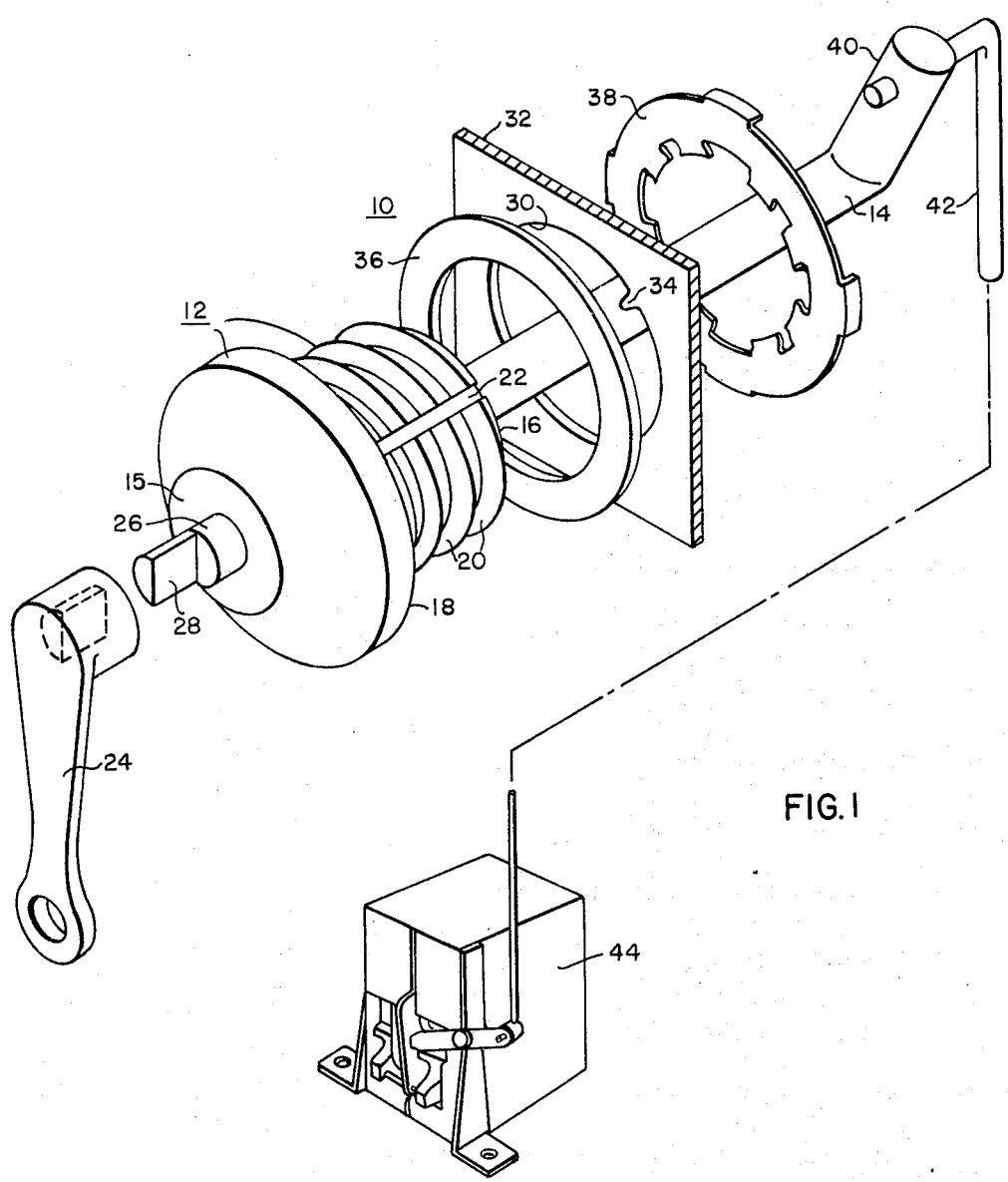
FIGURE 1 is a pictorial view of an operating mechanism constructed according to the teachings of the invention.

The invention relates to a new and improved operating mechanism for transmitting mechanical motion through a seal, comprising a cast body portion having one or more actuating shafts associated therewith, which may also accommodate electrical and/or mechanical indicating means. A first embodiment of the invention is pictorially illustrated in FIG. 1 of the drawings. In general, FIG. 1 illustrates an operating mechanism 10, including a cast body portion 12, and an actuating shaft 14 which is disposed through body portion 12 in a manner which seals the opening through the body portion without restricting the ability of shaft 14 to be actuated. In the embodiment of the invention shown in FIG. 1, the shaft is to be rotated, but the invention applies equally to shafts which require axial or rotary motion, or both. Body portion 12 is substantially cylindrical in shape, having first and second ends 15 and 16, respectively, and first and second major outer diameters. The first major outer diameter is adjacent the first end 15, and is larger than the second major outer diameter, which forms shoulder or flange 18 at the transition between the two major diameters. Body member or portion 12 may thus have its second end 16 and second diameter inserted into an opening in an enclosure, and the first diameter and first end 15 will extend outwardly from the enclosure. The second diameter may have threads 20 cast integrally thereon, or subsequently machined thereon, as shown in FIG. 1, or any other suitable mounting means may be used. The second diameter may also have a linear longitudinal groove 22 disposed therein, for oreintation purposes. The detailed assembly and cooperation of body portion 12 and shaft 14, including the means for sealing the shaft without restricting its intended operating characteristics, will be decribed in detail hereinafter.

FIG. 1 illustrates operating mechanism 10, along with its operating handle, mechanical linkage, and mounting means, in an exploded view. More sepcifically, operating mechanism 10 includes an operating handle 24 which is adapted to be secured to portion 26 of shaft 14, which portion extends outwardly from the first end of body member 12. Portion 26 of shaft 14 may have a flat 28 cut thereon for cooperating with handle 24, and for properly orienting handle 24, shaft 14, and groove 22 in body portion 12. In some instances, the shaft extension 26 may itself be bent or otherwise formed into a predetermined configuration, to form an operating handle integral with the shaft.

In the embodiment of the invention shown in FIG. 1, operating mechanism 10 is intended to be mounted through an opening 30 in a casing, tank or enclosure 32, with the enclosure being only partially shown. A projection 34 of enclosure 32, which extends into opening 30, is intended to align operating mechanism 10 relative to casing 32 by cooperating with the linear groove 22. A gasket member 36 is disposed between flange 18 on body portion 12 and casing 32, in order to seal opening 30. A conventional spring grip type nut 38 may be used to cooperate with threads 20, to hold operating mechanism 10 and gasket 36 in snug, sealed engagement with casing 32. The threads 20 and nut 38 are shown merely for purposes of example, however, as any suitable mounting means may be utilized. For example, flange 18 may have a plurality of openings cast therein, which may be aligned with openings in the casing and secured to the casing by nut and bolt combinations. Or, the mounting means disclosed in United States Patent 3,214,511, issued Oct. 26, 1965 and assigned to the same assignee as the present application, may be used if desired.

Portion 40 of shaft member 14, which is disposed within casing 32, may be shaped to form an arm or lever, which cooperates with linkage member 42. Linkage member 42 is connected to operate mechanical device 44, which is disposed within enclosure 32. Mechanical device 44 may be a circuit breaker, as shown, and casing or enclosure 32 may be the enclosure for a distribution transformer, or device 44 may be any other apparatus which requires mechanical actuation external to its enclosure, without breaking the enclosure seal.

Figure 2:
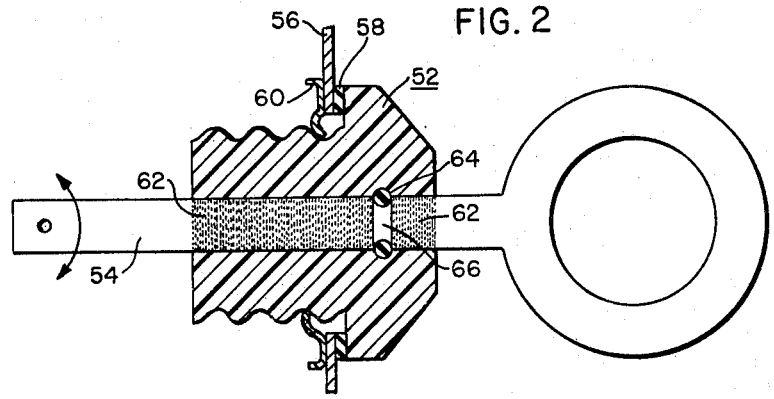
FIG. 2 is an elevational view, partially in section, of an operating mechanism which allows rotary shaft motion, constructed according to an embodiment of the invention.

In the operating mechanism shown in FIGURE 1, it is desirable to provide a shaft 14 which is free to be rotated in response to mechanical actuation of handle 24, with the rotary movement of the shaft being accomplished without destroying the air, moisture, and oil seal between shaft 14 and body portion 12. FIG. 2 illustrates an embodiment of the invention which will provide this cooperation between the shaft and the body portion.

More specifically, FIG. 2 is an elevational view, partially in section, of an operating mechanism 50 constructed according to the teachings of the invention. Operating mechanism 50 includes a cast body portion 52 and a shaft member 54, similar to the operating mechanisms 10 shown in FIG. 1, except shaft 54 is terminated at each of its ends with different types of actuating means. Body portion 52 is secured in sealed engagement with an enclosure 56 by gasket member 58 and spring grip nut 60.

Body portion 52 is formed of a cast resin system. The electrical insulating requirements of the cast resin system may not be as demanding as they are on resin systems used to encapsulate high voltage electrical windings, or to form high voltage electrical insulating bushings, as the body portion of the operating mechanism will not be subjected to large electrical stresses. Therefore, the resin system used may be formulated to provide the necessary mechanical strength and resistance to oil, or other fluids which may come into contact with it during its intended operation. One important characteristic of the resin system is that it have a coefficient of thermal expansion which closely matches that of the material of which shaft 54 is formed, in order to prevent either binding or loosening of the shaft during temperature cycling. Further, the resin system should not shrink appreciably upon setting and curing. Shrinkage can be minimized, and the coefficient of thermal expansion of the resin system closely matched to that of the material of which the shaft is made, by filling the resin with inert, particulated, inorganic fillers, such as quartz, silica, or beryllium aluminum silicate.

The resin used for body portion 52 may be an epoxy, polyester, phenolic, or any other suitable type, and may be thermosetting or thermoplastic. If thermoplastic, its softening temperature should be higher than the operating temperature of the apparatus the operating mechanism is to be associated with.

The operating mechanism is completely formed in one casting step, with shaft 54 first being introduced and positioned within the mold used to form body portion 52, and then the casting resin. In order to keep the casting resin from adhering to the shaft 54, suitable mold release means 62 is disposed over the surface of the shaft which will come into contact with the resin. The mold release means 62 may be a silicone, or epoxy base grease, or any other suitable mold release means. Mold release means 62, in addition to providing the function of preventing the resin system from adhering to the shaft 54, also performs the function of lubricating the shaft during its subsequent use, and aids in sealing the shaft against air; moisture and oil.

In order to form an additional shaft seal, a resilient ring-like member 64, such as an O-ring formed of neoprene or other elastomeric material, is telescoped over the shaft 54 before casting such that the inner diameter of ring 64 snugly encompasses the shaft. When applying the mold release material 62 to shaft 54, care should be taken to prevent the mold release means from contacting ring 64. When the resin is set and cured, it will adhere to ring 64, without bonding ring 64 and shaft 54 together, providing a tight fit which insures that the shaft will be sealed.

In the embodiment of the invention whereby only rotary shaft movement is desired, ring 64 may be utilized in cooperation with an annular groove 66 in the shaft to prevent axial motion. In this instance, as shown in FIG. 2, ring 64 has an inner diameter which allows it to fit snugly in groove 66, but to be only partially contained therein. Thus, with the resin system adhering to ring 64, the position of the shaft will be fixed axially with respect to body portion 52, as the portion of ring 64 which protrudes from the groove is fixed to body portion 52, preventing axial movement of the shaft.

Shaft member 54 may be constructed of any suitable material having the necessary mechanical strength and corrosion resistance for its intended environment. For example, materials like brass, aluminum, stainless steel, or even shafts formed of an insulating material may be used.

In FIG. 2, ring 64 provides the function of sealing shaft 54, and it also cooperates with a groove 66 in the shaft to prevent axial movement. These functions may be separated, as shown in FIG. 3, by axially spacing the ring and the groove on the shaft.

Figure 3:
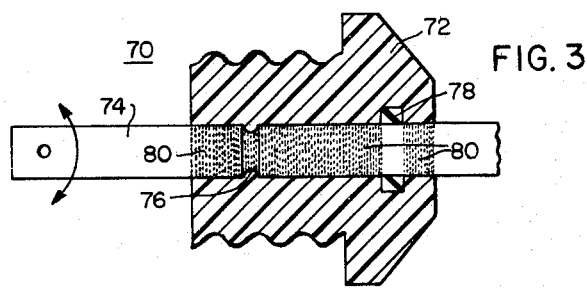
FIG. 3 is an elevational view, partially in section, of an operating mechanism which illustrates another embodiment of the invention for providing rotary shaft motion.

More specifically, FIG. 3 illustrates an operating mechanism 70, having a body portion 72 and a shaft member 74. Shaft member 74 includes an annular groove 76, and a resilient ring 78 which is telescoped over the shaft, and axially spaced from the groove. Mold release means 80 is disopsed over the outer surface of shaft 74, and with ring 78 in place, shaft 74 is disposed in the mold for body portion 72 and the resinous casting material is introduced into the mold. Care is to be taken to prevent mold release compound from contaminating ring 78. The resin will enter groove 76 and set, to prevent axial movement of the shaft. The resin will adhere to ring 78, and ring 78 being in snug engagement with shaft 74, will seal the shaft against air, oil, moisture or any other contaminants.

Figure 4:
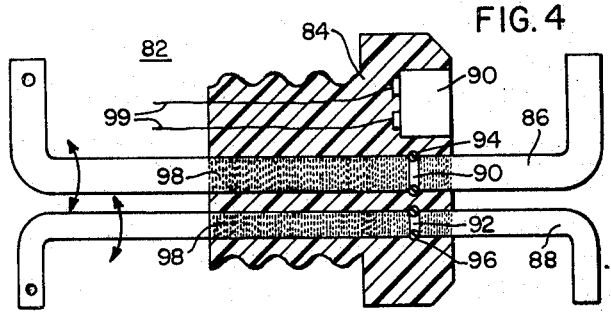
FIG. 4 is an elevational view, partially in section, of an operating mechanism which illustrates the incorporation of more than one actuating shaft, and the incorporation of an electrical indicating device.

FIG. 4 is an elevational view of an operating mechanism 82, shown partially in section, which illustrates other embodiments of the invention. In general, FIG. 4 illustrates that more than one actuating shaft may be disposed in one body portion, and further, that electrical signalling or indicating means, such as an indicating light, may be easily disposed in the body portion, without the usual electrical insulating problems encountered with machined metallic operating mechanisms.

More specifically, operating mechanism 82 includes cast body portion 84, constructed as hereinbefore described relative to the operating mechanism shown in FIG. 2, two operating shafts 86 and 88, which extend between the ends of the body portion and in spaced relation relative to one another and a socket 90 for receiving an indicating lamp. This type of operating mechanism would be especially suitable for devices such as circuit breakers of the type used in electrical distribution transformers, which require an operating mechanism for operating the breaker, an operating mechanism for operating the emergency control which sets the breaker to carry emergency overloads, and a signal or warning light which lights in advance of automatic breaker operation.

Operating mechanism 82 shown in FIG. 4 may be prepared by providing shafts 86 and 88 with annular grooves 90 and 92 therein, if axial movement is to be prevented, disposing resilient rings 94 and 96 in grooves 90 and 92, respectively, as shown, or axially spaced therefrom as shown in FIG. 3, placing mold release compound 98 over the portion of shafts 86 and 88 which will come into contact with the resin system, and dispose the prepared shafts in the mold which forms body portion 84. The signal light socket 90, along with its electrical leads 99 are then positioned in the mold such that the light socket 90 will at least be partially embedded in the resinous material, and visible from at least one of the ends of the body portion, and then the resin system is introduced. The resin system is set and cured according to techniques, well known in the art. The electrical insulating characteristic of the resin system will automatically provide the electrical insulation necessary to solve the insulation problems which the relatively low voltage indicating lamp presented to prior art types of operating mechanisms. Thus, an operating mechanism which provides multiple functions may be formed as quickly and easily as an operating mechanism having a single function.

In some instances, it may be desirable to provide an operating mechanism which has the ability of providing only axial motion, or axial motion in addition to rotary motion. Although the operating mechanism shown in FIG. 3 could be modified to provide axial movement, in addition to rotary movement, by simply omitting the annular groove 76, this arrangement may not be desirable as the mold release material would be exposed when the shaft is axially moved.

Figure 5:
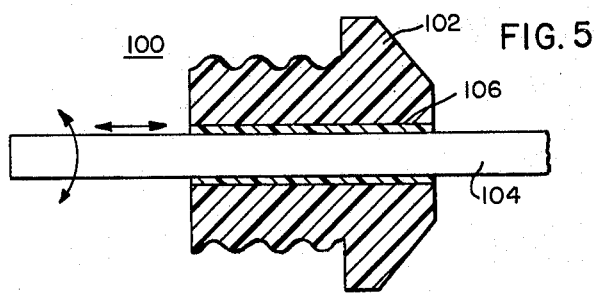
FIG. 5 is an elevational view, partially in section, of an operating mechanism constructed according to the teachings of the invention, which allows rotary and axial motion.

FIG. 5 is an elevational view, partially in section, of an operating mechanism 100 which may be fabricated to allow only axial motion, or axial and rotary motion, without using mold release material. Operating mechanism 100 includes a body portion 102 formed of resin, as hereinbefore described, and a shaft member 104 which extends through an opening disposed between opposite ends of the body portion. A sealing sleeve 106 is telescoped over shaft 104, prior to casting. Sealing sleeve 106 should have the characteristic of allowing the resin system to adhere to it, and of allowing the shaft to move without breaking the air, oil and moisture seal between the shaft 104 and sleeve 106. Materials which will perform these functions, and which may be used to form sealing sleeve 106, are polyvinylidene fluoride, and polytetrafluoroethylene. In the embodiments of the invention hereinbefore described, the shaft was necessary in the mold, at the time of casting, as the shaft is used as a mold to form the opening which extends between the opposite ends of the body portion. In the embodiment of the invention shown in FIG. 5, sleeve 106 forms the opening which extends between the ends of the body portion, and shaft 104 may be inserted within sleeve 106 subsequent to the casting operation, if the configuration of at least one of the ends of the shaft 104 is such that it may be inserted through the sleeve.

If both axial and rotary movement of shaft 104 is desired, in the embodiment of the invention shown in FIG. 5, shaft 104 should have a circular cross section, as will the inner opening in sealing sleeve 106. If only axial movement of shaft 104 is desired, shaft 104 and at least the internal opening of sealing sleeve 106 may have a square triangular, or other non-circular cross-section.

One method of forming operating mechanism 100 is to dispose shaft 104 with sleeve 106 telescoped into position over the shaft within the casting mold, and then introduce, set and cure the resin system. The resin system will adhere to the outer diameter of sealing sleeve 106, but shaft 104 will be free to move in sealed engagement relative to the sealing sleeve.

In some instances, instead of using a separate sleeve member, the sleeve may be formed directly on the shaft, of a material which will form on the shaft without adhering thereto, by brushing, dipping or spraying a suitable compound on the shaft. Examples of such a compound are plasticized cellulose and vinyl acetates.

While the operating mechanisms shown and described herein have all been directed to mounting the operating mechanism relative to a sealed enclosure after casting, it will be appreciated that in some applications, the operating mechanism may have the shaft disposed in the proper position, and have the body portion cast directly into position on the enclosure of the apparatus it is to be associated with. The resin system would thus adhere to the enclosure and eliminate the requirement for separate mounting hardware. With one casting step, the operating mechanism could be completed and mounted. Also, while the embodiments of the invention have been directed to operating mechanisms for applications which require mechanical motion to be directed into a sealed enclosure, it is to be understood that the invention applies equally to applications which require mechanical motion to be imparted through a wall member separating the enclosures; for example, through the wall member separating two oil-filled compartments in underload tap changer systems. Further, the cast insulating body portion of the operating mechanism may be the form of a panel member, and include one or more mechanical actuators disposed in sealed engagement therethrough, and also indicating devices if required. This concept may be used, for example, on control panels requiring an insulating barrier.

In summary, there has been disclosed new and improved operating mechanisms which eliminate the need for accurately machined metallic parts, elaborate costly shaft seals, and costly step-by-step assembly operations. The disclosed operating mechanisms are completely formed in one casting step, using an insulating resin system, with the operating shaft cast therein. Multiple shaft operating mechanisms may be formed as quickly and inexpensively as single shaft operating mechanisms, and electrical and/or indicating means may be incorporated within the body portion of the operating mechanisms at the same time that the shafts are cast therein. Further, the electrical insulating problems attendant with prior art operating mechanisms are eliminated, when following the teachings of the invention. The disclosed operating mechanisms are rugged, shock proof, air tight, oil tight, and corrosion resistant, and may be utilized for any application requiring mechanical actuation through a sealed shaft.

I claim as my invention:

1. An operating mechanism for transmitting mechanical motion through a seal, comprising a body portion having first and second ends, and at least one opening which extends between said first and second ends; said body portion being formed of a cast resin system; at least one shaft member; said at least one shaft member being disposed through the at least one opening; and sealing means disposed circumferentially around said at least one shaft member to provide an air seal between said sealing means and said shaft member; said sealing means including a resilient ring member and lubricating means; said ring member being disposed in a tight fitting manner about said shaft member, between the first and second ends of said body portion; said ring member being at least partially bonded to said body portion; said lubricating means being disposed on said shaft member, to facilitate mechanical movement of said shaft member relative to said body portion and said ring member, while maintaining the air seal between them.

2. The operating mechanism of claim 1 wherein said body portion has at least one additional opening extending between its ends, and including an additional shaft member disposed in said at least one additional opening, and sealing means, including a resilient ring member and and lubricating means, disposed to provide an air seal between said at least one additional shaft member and said body portion.

3. The operating mechanism of claim 1 including electrical indicating means, said electrical indicating means being at least partially embedded in the cast resin system of which said body portion is formed, and being visible from at least one of the ends of said body portion.

4. The operating mechanism of claim 1 in which the coefficient of thermal expansion of said cast body portion is substantially the same as the coefficient of thermal expansion of said shaft member.

5. The operating mechanism of claim 1 wherein said shaft member has an annular groove disposed therein, the cast resin system of said body portion extending into said annular groove to prevent axial movement of said at least one shaft member relative to said body portion.

6. The operating mechanism of claim 1 wherein said shaft member has an annular groove, with the resilient ring member being partially disposed in the annular groove in said shaft member, and having a portion which extends outwardly from said shaft member, the adherence of said body portion to said ring member preventing axial movement of said shaft member relative to said body portion.

7. The operating mechanism of claim 1 wherein said body portion has first and second major diameters which form a shoulder adapted for mounting said body portion against an associated enclosure.

8. The operating mechanism of claim 7 wherein one of the major diameters has threads disposed thereon adapted for receiving means for securing said body portion to an associated enclosure.

References Cited

UNITED STATES PATENTS

| 2,647,774 | 8/1953 | Newberry | 277—237 |
| 2,765,023 | 10/1956 | Fagg et al. | |
| 3,262,720 | 7/1966 | Briegel | 277—212 XR |

LAVERNE D. GEIGER, Primary Examiner

JEFFREY S. MEDNICK, Assistant Examiner

U.S. Cl. X.R.

277—58, 178, 212